United States Patent [19]
Akkapeddi et al.

[11] Patent Number: 5,162,440
[45] Date of Patent: Nov. 10, 1992

[54] COMPOSITIONS OF POLYPHENYLENE OXIDES AND THERMOPLASTIC POLYMERS

[75] Inventors: Murali K. Akkapeddi, Morris Plains; Bruce VanBuskirk, Randolph; Alan C. Brown, Somerset, all of N.J.

[73] Assignee: Allied-Signal Inc., Morristown, N.J.

[21] Appl. No.: 471,903

[22] Filed: Jan. 29, 1990

Related U.S. Application Data

[63] Continuation of Ser. No. 174,521, Apr. 11, 1988, abandoned, which is a continuation-in-part of Ser. No. 42,192, Apr. 24, 1987, abandoned.

[51] Int. Cl.$^5$ .......................... C08F 8/08; C08F 8/30; C08F 8/3; C08L 51/04
[52] U.S. Cl. ....................................... 525/149; 525/63; 525/66; 525/67; 525/68; 525/132; 525/395; 525/396; 525/397; 525/905
[58] Field of Search .................. 525/68, 132, 149, 905, 525/67

[56] References Cited

U.S. PATENT DOCUMENTS 4,654,405  3/1987  Jalbert et al. ................ 525/397
4,839,425  6/1989  Mawatari et al. ............. 525/397

Primary Examiner—Jacob Ziegler
Assistant Examiner—d
Attorney, Agent, or Firm—Melanie L. Brown; Roger H. Criss

[57] ABSTRACT

The present invention relates to a melt blended composition of the reaction product of about 70 to 99.99 percent by weight polyphenylene oxide, and about 0.01 to 30 percent by weight of a substituted olefin having the formula:

$$\begin{array}{c} R_1 \;\; R_3 \\ | \;\;\;\; | \\ C=C \\ | \;\;\;\; | \\ R_2 \;\; R_4 \end{array}$$

wherein one to two of $R_1$, $R_2$, $R_3$ and $R_4$ are moieties containing reactive groups selected from carboxylic acid, acid anhydride, acid amide, imido, carboxylic ester, amino, hydroxyl, epoxy, group, oxazoline, oxazolone, oxazine, oxazinone, isocyanate, carbamate, carbamoyl lactam, acyl lactam, and mixtures and derivatives thereof, and wherein the remaining two to three of $R_1$, $R_2$, $R_3$ and $R_4$ are H or a hydrocarbon radical of from 1 to about 20 carbon atoms; and polyolefin.

The present invention also relates to a blended composition of the foregoing reaction product; thermoplastic polymer; and a functionalized ethylene α-olefin rubber. The melt blended composition has good impact resistance.

5 Claims, No Drawings

COMPOSITIONS OF POLYPHENYLENE OXIDES AND THERMOPLASTIC POLYMERS

CROSS-REFERENCE TO RELATED APPLICATION

This application is a continuation of application Ser. No. 174,521, filed Apr. 11, 1988, which is a continuation-in-part of Ser. No. 07/042,192 filed Apr. 24, 1987, now both abandoned.

BACKGROUND OF THE INVENTION

This invention relates to functionalized polyphenylene oxides; compositions of functionalized polyphenylene oxides and thermoplastic polymers; and compositions of functionalized polyphenylene oxides, thermoplastic polymers, and rubbers.

Compositions of polyphenylene oxide and thermoplastic plastic polymers are known. In particular polyphenylene oxide and polyamides compositions have been made as indicated in U.S. Pat. Nos. 3,379,792 and 4,338,421. Such compositions are brittle unless other additives are incorporated into the compositions.

Patents such as U.S. Pat. No. 4,315,086 and European Patent Application 0 129 825 disclose compositions of polyphenylene oxide, also known as polyphenylene ether, and polyamides. These disclosures indicate that it is known to include an additional additive to enhance the properties of the composition. It is conjectured that such an additive provides a reactive linkage between the polyphenylene oxide and the polyamide. This linkage has been presumed to be a graft linkage.

It is known that the impact resistance of thermoplastic polymers such as polyamide, and polyesters such as polyethylene terephthalate can be improved by blending with elastomeric polymers. It is also known to add elastomeric or rubbery polymers to blends of polyphenylene oxide and polyamides where such compositions contain grafting agents. This is disclosed in U.S. Pat. No. 4,315,086.

It would be desirable to have functionalized polyphenylene oxides; and compositions of functionalized polyphenylene oxides and thermoplastic polymers.

SUMMARY OF THE INVENTION

One embodiment of the modified polyphenylene oxide of the present invention consists essentially of the reaction product of polyphenylene oxide and a substituted olefin. For the purposes of the present invention as regards only the reaction product of polyphenylene oxide and the substituted olefin, the term "consists essentially of" indicates that the composition formed of the reaction product does not contain substantial amounts of additional ingredients which are reactive with either the polyphenylene oxide or the substituted olefin. More specifically, this embodiment of the present invention is a composition consisting essentially of the reaction product of from about 70 to 99.99 percent by weight polyphenylene oxide, and from about 0.01 to 30 percent by weight of a substituted olefin having the formula:

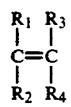

wherein one to two of $R_1$, $R_2$, $R_3$ and $R_4$ individually are moieties containing reactive groups selected from epoxy group, oxazoline, oxazolone, oxazine, oxazinone, isocyanate, and mixtures and derivatives thereof, and wherein the remaining two to three of $R_1$, $R_2$, $R_3$ and $R_4$ individually are H or a hydrocarbon radical of from about 1 to 20 carbon atoms.

The present invention also comprises the reaction product of from about 70 to 99.99 percent by weight of polyphenylene oxide and from about 0.01 to 30 percent by weight of certain substituted olefins. More specifically, this embodiment is directed to a composition comprising the following substituted olefins:

wherein one to two of $R_1$, $R_2$, $R_3$ and $R_4$ individually are moieties containing reactive groups selected from an oxazoline, oxazolone, oxazine, oxazinone, isocyanate, and mixtures and derivatives thereof, and wherein the remaining two to three of $R_1$, $R_2$, $R_3$ and $R_4$ individually are H or a hydrocarbon radical of from 1 to about 20 carbon atoms.

The substituted olefin can be substituted with an oxazoline or oxazine radical having the formula:

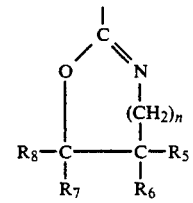

wherein $R_5$–$R_8$ individually are selected from H, and hydrocarbon groups such as alkyl groups having from 1 to 20 and preferably 1 to 5 carbon atoms, and aryl groups having from 6 to 14 carbon atoms. The alkyl and aryl groups optionally contain substituents which are substantially unreactive with the olefinic double bond or the oxazoline or oxazine. n is 0 for oxazoline and 1 for oxazine. $R_5$ and $R_6$ are preferably —H or —CH$_3$ and most preferably —H. $R_3$ and $R_4$ are preferably —H.

The substituted olefin can be substituted with an oxazolone or oxazinone radical having the formula:

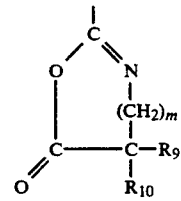

wherein $R_9$ and $R_{10}$ are individually selected from H, alkyl groups having from 1 to 20 and preferably 1 to 5 carbon atoms, and aryl groups having from 6 to 14 carbon atoms. The alkyl and aryl groups optionally contain substituents which are substantially unreactive with the olefinic double bond or the oxazolone or oxazinone. m is 0 for oxazolone and 1 for oxazinone. $R_9$ and $R_{10}$ are preferably —H or $CH_3$, and most preferably, —H.

The substituted olefin can be substituted with an acyl lactam of the following structure:

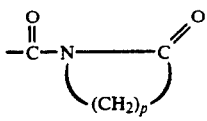

where p is from 2 to 11.

The substituted olefin can be substituted with an isocyanate (—N=C=O), or carbamate, or carbamoyl lactam derivative. The carbamate derivative has the following formula:

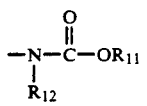

where $R_{11}$ and $R_{12}$ individually are selected from H, an alkyl radical, or an aryl radical. The carbamoyl lactam radical has the following formula:

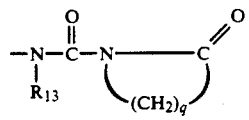

where $R_{13}$ is selected from H, an alkyl radical, or an aryl radical, and where q is from 2 to 11.

None of $R_{1-13}$ should contain carboxylic acid groups, anhydride groups, amide groups, sulfide groups, or other functionalities which will react with the above reactive groups.

In another embodiment, a composition comprises (a) from about 5 to 95 percent by weight of a reaction product of
(1) from about 70 to 99.9 percent by weight polyphenylene oxide and
(2) from about 0.01 to 30 percent by weight of a substituted olefin having the formula:

wherein one to two of $R_1$, $R_2$, $R_3$, and $R_4$ individually are selected from a reactive group consisting of carboxylic acid, acid anhydride, acid amide, imido, carboxylic ester, amino group, hydroxyl group, epoxy group, oxazoline, oxazolone, oxazine, oxazinone, isocyanate, carbamate, carbamoyl lactam, acyl lactam, and mixtures and derivatives thereof and wherein the remaining two to three of $R_1$, $R_2$, $R_3$, and $R_4$ individually are H or a hydrocarbon radical of from about 1 to 20 carbon atoms: and (b) from about 5 to 95 percent by weight of a polyolefin which is reactive with the reactive groups.

In another embodiment, a composition comprises:
(a) about 5 to 95 percent by weight, based on the total weight of the composition, of a reaction product comprising (1) about 70 to 99.99 percent by weight polyphenylene oxide; and (2) about 0.01 to 30 percent by weight of a substituted olefin having the formula:

wherein one to two of $R_1$, $R_2$, $R_3$ and $R_4$ individually are selected from a reactive group consisting of a carboxylic acid, acid anhydride, acid amide, imido, carboxylic ester, amino group, hydroxyl group, epoxy group, oxazoline, oxazolone, oxazine, oxazinone, isocyanate, carbamate, carbamoyl lactam, acyl lactam, and mixtures and derivatives thereof, and wherein the remaining two to three of $R_1$, $R_2$, $R_3$, and $R_4$ individually are H or a hydrocarbon radical of from 1 to about 20 carbon atoms; (b) about 5 to 95 percent by weight, based on the total weight of the composition, of a thermoplastic polymer which is blended with the reaction product; and (c) about 5 to 50 percent by weight, based on the total weight of the composition of a functionalized ethylene propylene rubber. Examples of useful thermoplastic polymers include polyolefins, polyamides, and polyesters; these polymers should be reactive with the reactive groups of the reaction product.

The present invention also includes methods of making the reaction product and compositions containing the reaction product. The compositions of the present invention can be prepared by conventional polymer melt blending techniques. This method is typically conducted at a temperature above the melting temperature of the polymeric additives in a closed mixing device such as an extruder. The method comprises melt blending polyphenylene oxide and the substituted olefin to form a reaction product. The reaction product can also be called a modified or functionalized polyphenylene oxide. The reaction product is then melt blended with about 5 to 95 percent by weight of a thermoplastic polymer.

To prepare compositions containing nonreactive elastomeric polymer, the method comprises melt blending the nonreactive elastomeric polymer with the polyphenylene oxide and substituted olefin. Preferably, the elastomeric polymer is blended together with the reaction product of the polyphenylene oxide and substituted olefin, and this composition is then melt blended with the thermoplastic polymer.

Other objects and advantages of the present invention will become apparent from the following description and appended claims

DESCRIPTION OF THE PREFERRED EMBODIMENTS

In one embodiment, the present invention is directed to a reaction product of polyphenylene oxide and a substituted olefin. The reaction product has been found useful in compositions including polyolefins. In particular it is useful in thermoplastic polymers which are reactive with the reactive group of the reaction product. The present invention includes a composition consisting essentially of the reaction product of from about 70 to 99.99, preferably about 90 to 99.9 and more preferably about 95 to 99 percent by weight of polyphenylene oxide and correspondingly about 0.01 to 30, about 0.1 to 10, and most preferably about 1 to 5 percent of this substituted olefin. The substituted olefin has the formula:

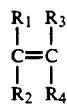

wherein one to two of $R_1$, $R_2$, $R_3$ and $R_4$ individually are moieties containing reactive groups selected from a reactive group consisting of a carboxylic acid, acid anhydride, acid amide, imido, carboxylic ester, amino, hydroxyl, epoxy, oxazoline, oxazolone, oxazine, oxazinone, isocyanate, carbamate, carbamoyl lactam, acyl lactam, and mixtures and derivatives thereof, and wherein the remaining two to three of $R_1$, $R_2$, $R_3$ and $R_4$ individually are H or a hydrocarbon radical of from 1 to about 20 carbon atoms.

Another embodiment of the present invention is a composition comprising the reaction product of from about 70 to 99.99, preferably about 90 to 99.9, and most preferably about 95 to 99 percent by weight of polyphenylene oxide, and correspondingly from about 0.01 to 30, preferably about 0.1 to 10, and most preferably about 1 to 5 percent of substituted olefins having the formula:

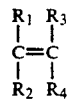

wherein one to two of $R_1$, $R_2$, $R_3$ and $R_4$ individually are selected from a reactive group consisting of an oxazoline, oxazolone, oxazine, oxazinone, isocyanate, carbamate, carbamoyl lactam, acyl lactam, and mixtures and derivatives thereof, and wherein the remaining two to three of $R_1$, $R_2$, $R_3$ and $R_4$ individually are H or a hydrocarbon radical of from 1 to about 20 carbon atoms.

Particularly preferred reactive groups which are substituents to the substituted olefins include an oxazoline or oxazine radical which has the formula:

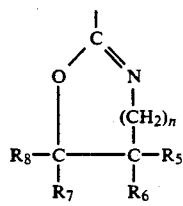

wherein $R_5$-$R_8$ individually are selected from H, and hydrocarbon groups such as alkyl groups having from 1 to 20 and preferably 1 to 5 carbon atoms, and aryl groups having from 6 to 14 carbon atoms. The alkyl and aryl groups optionally contain substituents which are substantially unreactive with the olefinic double bond or the oxazoline or oxazine. n is 0 for oxazoline and 1 for oxazine. $R_5$ and $R_6$ are preferably individually —H or —$CH_3$ and most preferably —H. $R_3$ and $R_4$ are preferably —H.

The substituted olefin can be substituted with an oxazolone or oxazinone radical having the formula:

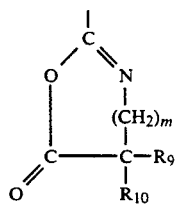

wherein $R_9$ and $R_{10}$ individually are selected from H, alkyl groups having from 1 to 20 and preferably 1 to 5 carbon atoms, and aryl groups having from 6 to 14 carbon atoms. The alkyl and aryl groups optionally contain substituents which are substantially unreactive with the olefinic double bond or the oxazolone or oxazinone, and aryl halides. m is 0 for oxazolone and 1 for oxazinone. $R_9$ and $R_{10}$ are preferably individually —H and $CH_3$, and most preferably, —H.

The substituted olefin can be substituted with an acyl lactam of the following structure:

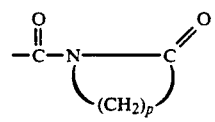

where p is from 2 to 11.

The substituted olefin can be substituted with an isocyanate (—N=C=O), or carbamate, or carbamoyl lactam derivative. The carbamate derivative has the following formula:

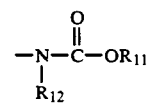

where $R_{11}$ and $R_{12}$ individually are selected from H, an alkyl radical, or an aryl radical. The carbamoyl lactam radical has the following formula:

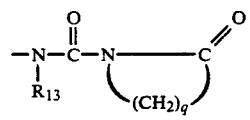

where $R_{13}$ is selected from H, an alkyl radical, or an aryl radical, and where q is from 2 to 11.

None of $R_{1-13}$ should contain carboxylic acid groups, anhydride groups, amide groups, sulfide groups, or other functionalities which will react with the above reactive groups.

The present invention includes a composition comprising from about 5 to 95, preferably about 30 to 70, and more preferably about 40 to 60 percent by weight of the modified polyphenylene oxide (the reaction product) and correspondingly about 5 to 95, preferably about 30 to 70, and more preferably about 40 to 60 percent of a polyolefin which is reactive with the reactive groups of the reaction product.

The present invention also includes compositions containing modified polyphenylene oxide; thermoplastic polymer such as polyolefin, polyamide, polyester and blends thereof; and from about 5 to 50, preferably about 10 to 40, and more preferably, about 15 to 30 percent by weight functionalized ethylene propylene rubber based on the total polymer weight of the composition.

The most preferred reactive groups on the substituted olefin include carboxylic acids and derivatives thereof including anhydrides. Particularly preferred are polycarboxylic acids and derivatives thereof. Specific and preferred carboxylic acids and anhydrides include maleic anhydride, maleic acid, fumaric acid, vinyl trimellitate anhydride, morpholinylmaleamic acid, cinnamic acid, bis(2-hydroxyethyl) fumaramide, n-methacrylyl laurolactam, n-methacrylyl caprolactam, p-aminostyrene, glycidyl acrylate, styrene/glycidyl methacrylate (GMA) copolymer, styrene/piperylene/GMA terpolymer, and diallylamine-iso-butyloxycarbonyl. Other preferred materials include oxazoline such as 2-isopropenyl oxazoline, 2-styryl oxazoline, and m-phenylene bisoxazoline. Particular embodiments of the reactive groups on the substituted olefin include oxazoline or oxazine having the formula:

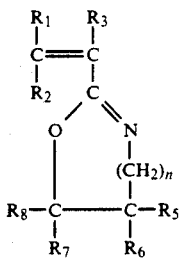

wherein $R_1$–$R_8$ individually are selected from H, alkyl groups having from 1 to 20 and preferably 1 to 5 carbon atoms, and aryl groups having from 6 to 14 carbon atoms, the alkyl and aryl groups optionally containing substituents which are substantially unreactive with the olefinic double bond of the oxazoline or oxazine; and n is 0 for oxazoline and 1 for oxazine. $R_5$, $R_6$, and $R_3$ individually are preferably —H and —$CH_3$, and most preferably, H. $R_8$, $R_7$, $R_1$ and $R_2$ are most preferably H.

The substituted olefin can be an oxazolone or oxazinone having the formula:

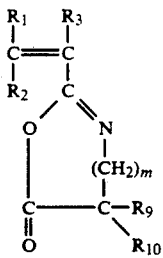

wherein $R_9$, $R_{10}$ and $R_3$ individually are selected from H, alkyl groups having from 1 to 20 and preferably 1 to 5 carbon atoms, aryl groups having from 6 to 14 carbon atoms, the alkyl and aryl groups optionally containing substituents which are substantially unreactive with the olefinic double bond of the oxazolone or oxazinone, the aryl halides. $R_1$ and $R_2$ are H; and m is 0 for oxazolone and 1 for oxazinone. $R_9$, $R_{10}$, and $R_3$ individually are preferably —H and —$CH_3$, and most preferably, —H.

None of $R_1$–$R_{10}$ should contain carboxylic acid groups, anhydride groups, amide groups, sulfide groups, or other functional groups reactive with the reaction product.

The substituted olefin has a first functional group, the ethylenically unsaturated double bond, which is reactive with the polyphenylene oxide, and a second functional group, the oxazoline, oxazine, oxazolone, oxazinone, isocyanate, carbamate, carbamoyl lactam, or acyl lactam which is reactive with the thermoplastic polymer.

The present invention includes a method of forming a modified polyphenylene oxide composition which is the reaction product of polyphenylene oxide and the substituted olefin. It is preferably made by melt blending polyphenylene oxide and a substituted olefin above the melt temperature of the polyphenylene oxide.

The present invention also includes a method comprising the steps of making the reaction product as recited above and melt blending it with from about 5 to 95 percent by weight of a polyolefin. In a preferred embodiment, from about 5 to 50 percent of a rubbery polymer is melt blended with the polyolefin. In a preferred embodiment the elastomeric polymer is blended with the reaction product before addition to the polyolefin. Alternately but not as preferred, polyphenylene oxide, substituted olefin, and elastomeric polymer can be blended prior to melt blending with the polyolefin.

The present invention also includes a method comprising the steps of making the reaction product as recited above and melt blending it with from about 5 to 95 percent by weight of a thermoplastic polymer and from about 5 to 50 percent by weight of a functionalized ethylene propylene rubber. In a preferred embodiment, the functionalized ethylene propylene rubber is blended with the reaction product before addition to the thermoplastic polymer. Alternately but not as preferred, polyphenylene oxide, substituted olefin, and functionalized ethylene propylene rubber are blended prior to melt blending with the thermoplastic polymer.

While not being bound to any particular theory, it is believed that the substituted olefin used in the present invention modifies the polyphenylene oxide by a bond through the olefinic double bond of the substituted olefin. This bond forms a graft to the polyphenylene oxide. It is believed that the reactive groups of the reaction product react with groups on the thermoplastic polymer. Thereby the substituted olefin can form a linkage between the polyphenylene oxide and the thermoplastic polymer. This chain is believed to be a graft formed by a reaction between the olefinic group and the polyphenylene oxide on one side and the reactive group and the thermoplastic polymer on the other side. For example if the polyamide has amine groups on some of the polymeric chain ends, the reactive groups could be acids or anhydrides or other groups which are reactive with the amine groups on the polyamide. The reaction graphs the polyamide to the polyphenylene oxide through the substituted olefin. Although certain substituted olefins were known in the art, the composition of the present invention is much more effective by initially forming a prereacted reaction product of the substituted olefin with the polyphenylene oxide. This is illustrated in the accompanying examples and comparative examples.

Polyphenylene oxide useful in the present invention is a well-known polymer. Polyphenylene oxides can be formed in accordance with processes described in U.S. Pat. Nos. 3,306,875; 3,360,875; 3,337,501; and 3,787,361. U.S. Pat. No. 4,315,086 describes a method to prepare polyphenylene oxide polymers. In this method, oxidation-polymerization of a phenol compound having the formula:

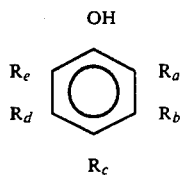

wherein $R_a$, $R_b$, $R_c$, $R_d$, and $R_e$ are each a hydrogen atom, a halogen atom, hydrocarbon, or substituted hydrocarbon radical and at least one of them is a hydrogen atom, with oxygen or an oxygen-containing gas in the presence of an oxidation-coupling catalyst produces the polyphenylene oxide polymers.

Specific examples of $R_a$, $R_b$, $R_c$, $R_d$, $R_e$ in the above formula include hydrogen, chlorine, fluorine, bromine, and iodine atoms, and methyl, ethyl, propyl, butyl, chloroethyl, hydroxyethyl, phenolethyl, benzol, hydroxymethyl, carboxyethyl, methoxycarbonylethyl, cyanoethyl, phenol, chlorophenol, methylphenyl, dimethyl phenol, and ethyl phenol groups.

Specific examples of phenol compounds include phenol, o-,m-or p-cresol, 2,6-, 2,5-, 2,4-, or 3,5-dimethylphenol, 2-methyl-6-phenyl phenol, 2,6-diphenylphenol, 2,6-diethylphenol, 2-methyl-6-ethylphenol, and 2,3,5-,2,3,6- or 2,4,6-trimethylphenol. These phenol compounds may be used as a mixture. Other phenol compounds which can be used include dihydric phenols (e.g., bisphenol A tetrabromobisphenol A, resorcinol, and hydroquinone).

Oxidation-coupling catalysts known in the art can be used. Typical examples of such catalysts include a cuprous salt of a tertiary amine (e.g., cuprous chloride-trimethylamine, cuprous acetate-triethylamine, cuprous chloride-pyridine), catalysts comprising cupric salt-tertiary amines and alkaline metal hydroxide (e.g., cupric chloride-pyridine-potassium hydroxide), catalysts comprising manganese salts and a primary amine (e.g., manganese chloride-ethanolamine, manganese acetate-ethylene diamine), catalysts comprising a manganese salt and an alcoholate or phenolate (e.g., manganese chloride-sodium methylate, manganese chloride-sodium phenolate) and catalysts comprising a combination of a cobalt salt and a tertiary amine.

Preferred polyphenylene oxides include poly (2,6-dimethyl-1,4-phenylene oxide), poly(2-methyl-1,4-phenylene oxide), poly(3-methyl-1,4phenyleneoxide), poly(2,6-diethyl 1,4-phenylene oxide), poly(2-6-dipropyl-1,4-phenylene oxide), poly(2-methyl-6-allyl-1,4-phenylene oxide). poly(2,6-dichloromethyl-1,4-phenylene oxide), poly(2,3,6-trimethyl-1,4-phenylene oxide), poly(2,3,5,6-tetramethyl-1,4-phenylene oxide), poly(2,6-dichloro-1,4-phenylene oxide), poly(2,6-diphenyl-1,4-phenylene oxide), and poly(2,5-dimethyl-1,4-phenylene oxide).

Copolymers of the phenol compounds also may be used. The more preferred polyphenol polyphenylene is poly(2,6-dimethyl-1,4-phenylene) oxide. Useful polyphenyl oxides of the above-referenced application have a number average molecular weight of from 10,000 to 75,000. The intrinsic Viscosity (IV) as measured in a chloroform solution is 0.3 to 0.85 and preferably 0.4 to 0.6.

The composition of the present invention includes a thermoplastic polymer. The thermoplastic polymer has an ASTM D-638 tensile modulus greater than about 20,000 psi (134 MPa), typically greater than 25,000 psi (172 MPa), and preferably greater than 40,000 psi (276 MPa). Useful thermoplastic polymers for the present invention are functionalized in that they have reactive groups along the polymer chain, attached to the polymer chain, or as a branch or end group. Functional groups include carboxyl, anhydride amino, imino, hydroxyl, and the like, with carboxyl, amino, and hydroxyl groups most preferred. Useful thermoplastic polymers include polyamides, polyesters, and polyolefins which are functionalized with groups selected from carboxyl, hydroxyl, anhydride, and amine, and mixtures thereof. More preferred thermoplastic polymers are polyethylene terephthalate, polybutylene terephthalate, polyepsiloncaprolactam, polyhexamethylene adipamide, polytetramethylene adipamide, aromatic polyamides, and polypropylene.

Polyamides suitable for use herein include the long chain polymeric amides having recurring amide groups as part of the polymer backbone and preferably having a number average molecule weight, as measured by end group titration of about 15,000 to 40,000. The polyamides suitable for use herein can be produced by any conventional process known in the art.

Non-limiting examples of such polyamides are: (a) those prepared by the polymerization of lactams, preferably epsilon-caprolactam (nylon 6); (b) those prepared by the condensation of a diamine with a dibasic acid, preferably the condensation of hexamethylene diamine with adipic acid (nylon 6,6) and the condensation of hexamethylene diamine with sebacic acid (nylon 6,10), the condensation of tetramethylenediamine with adipic acid (nylon 4,6), and the condensation of metaxylylene diamine with adipic acid and/or terephthalic-/isophthalic acid and/or epsilon caprolactam; and those prepared by self-condensation of amino acids, preferably self-condensation of 11-amino-undecanoic acid (nylon 11) or 12-aminododecanoic acid (nylon 12); or random, block, or graft interpolymers consisting of two or more of these polyamides. Preferred are those obtained by the polymerization of epsilon-caprolactam.

Polyamides such as nylon-6 or nylon 6,6 can contain a variety of terminal functionality, including: (a) a carboxyl group attached to both ends of the polyamide chain; (b) a carboxyl group attached to one end and an amide group attached to the other end of the polyamide chain (the "capped" end) (only polylactams); (c) an amino group attached to both ends of the polyamide chain; (d) a carboxyl group attached to one end and an amine group attached to the other end of the polyamide chain (only polylactams); and mixtures thereof. Amine terminated polyamides are preferred.

For the purposes of the present invention, amine terminated polyamide is considered to be a polyamide comprising molecules having amino end groups as at least two end groups of the polyamide molecule. Polyamides having "excess" amine termination are polyamides having molecules with more than 50 mole percent and preferably 60 to 97 mole percent of its end groups as amino end groups. Amine end group termination is typically produced by including an excess of diamines during polymerization. A preferred diamine is hexamethylene diamine.

Other examples of diamines suitable for use herein include tetramethylene diamine, pentamethylene diamine, octamethylene diamine, decamethylene diamine, and dodecylamine. The amount of diamine needed to produce the excess amino terminated polyamides of the present invention varies depending on the amount of amine desired and the molecule weight of the resulting polymer and can be easily determined by one skilled in the art. For example, about 0.25 mole percent of hexamethylene diamine is required to produce a polyepsiloncaprolactam of about 21,000 number average molecular weight having about 80 equivalents/$10^6$ g amino end groups and about 17 equivalents/$10^6$ g acid end groups.

Similarly, polyamides having more than 50 mole percent of the end groups as acid end groups can be formed by having an excess of diacids such as sebacic acid present over diamines during polymerization. Such polyamides are considered acid terminated polyamides. Useful diacids include but are not limited to oxalic acid, malonic acid, succinic acid, glutaric acid, adipic acid, pimelic acid, suberic acid, azelic acid, and sebacic acid as noted.

The polyesters in the compositions of the present invention include linear, saturated polyesters of aromatic dicarboxylic acids. The preferred linear saturated polyesters include poly(ethylene terephthalate), poly(butylene terephthalate), and poly(1,4-cyclohexane dimethylene terephthalate), with poly(ethylene terephthalate) being most preferred due to its low molding temperatures. The poly(ethylene terephthalate) for use with the present invention preferably has an intrinsic viscosity range between about 0.4 and about 1.20, with a preferred intrinsic viscosity range between about 0.45 and 0.6. Intrinsic viscosity is obtained by extrapolation of viscosity values to zero concentration of solutions of poly(ethylene terephthalate) in 60 to 40 weight/weight ratio of phenol and tetrachloroethane. The measurements are normalized to 25° C. The poly(ethylene terephthalate) melts between about 250° and 275° C. The poly(ethylene terephthalate) can contain minor amounts, up to about 5%, of other comonomers such as 1,4 cyclohexanedimethanol, butylenediol, neopentylenediol, diethylene glycol, or glutaric acid.

Useful polyolefins include low, linear low, or high density polyethylene; polypropylene; polybutene-1; poly-3-methylbutene-1; poly-4-methylpentene-1; copolymers of monoolefins with other olefins (mono- or diolefins) or vinyl monomers such as ethylene-propylene copolymers, or with one or more additional monomers, i.e., EPDM ethylene/butylene copolymer; ethylene/vinyl acetate copolymer; ethylene/ethyl acrylate copolymer; propylene/4-methylpentene-1 copolymer and the like. A preferred polyolefin is polypropylene. The polyolefins have reactive groups thereon such as carboxyl, hydroxyl, anhydride, or amine.

Rubbery high molecular weight materials can be added to the reaction product to improve the overall impact resistance. It is preferable to have the rubbery materials prefunctionalized. Addition of such rubbers to the reaction product serves to improve properties obtained when the reaction products are then melt blended with the polyolefin, polyester, or polyamide. This is particularly evident when the reaction products are blended with polyamides. It has been found that the notched Izod of the final blends can be substantially improved while retaining a high elongation to break. While the present inventors do not wish to be bound by any theory, it is postulated that the inclusion of the functionalized rubbers may actually toughen the reaction product thermoplastic polymer interface.

The rubbery polymer is defined as having an ASTM D-638 tensile modulus of less than about 40,000 psi (276 MPa), typically less than 25,000 psi (172 MPa), and preferably less than 20,000 psi (138 MPa). It can be a block or graft copolymer. Useful rubbery polymers can be made from reactive monomers which can be part of the polymer chains or branches, or grafted on to the polymer. These reactive monomers can include dienes, and carboxylic acids and derivatives thereof such as esters and anhydrides. Such rubbery polymers include butadiene polymers, butadiene/styrene copolymers, isoprene, chloroprene, acrylonitrile/butadiene copolymers, isobutylene, isobutylene/butadiene copolymers, ethylene/propylene copolymers, and ethylene/propylene/diene copolymers. Useful rubbery polymers can include aromatic vinyl monomers, olefins, acrylic acid and methacrylic acid and their derivatives. Useful rubbery polymers and their preparation are disclosed in U.S. Pat. Nos. 4,315,086 and 4,174,358 which are incorporated herein by reference to the extent necessary to complete this disclosure.

The preferred rubber of the present invention includes a graft copolymer which is a copolymer of ethylene and an α-olefin other than ethylene copolymer having a graft moiety grafted to the ethylene copolymer. Useful graft moieties include carboxyl and carboxylate functionalities. The ethylene and α-olefin is preferably a copolymer of ethylene and an α-olefin selected from at least one $C_3$–$C_8$, and preferably, $C_3$–$C_6$ α-olefin. Propylene is the preferred monomer selected as the $C_3$–$C_6$ α-olefin in the copolymer. Other $C_3$–$C_6$ α-olefins, such as 1-butene, 1-pentene, and 1-hexene can be used in place of or in addition to propylene in the copolymers.

The carboxyl or carboxylate functionality, can be supplied by reacting the ethylene/$C_3$–$C_6$ α-olefin copolymer with an unsaturated graft moiety taken from the class consisting of α,β-ethylenically unsaturated dicarboxylic acids having from 4 to 8 carbon atoms, or derivatives thereof. Such derivatives include anhydrides of the dicarboxylic acids, or the metal salts of the acids, or the monoester of the dicarboxylic acid having from 0 to 100 percent of the carboxylic acid groups ionized by neutralization with metal basic salt, and the like. Illustrative of such acids and derivatives are maleic acid, maleic anhydride, maleic acid monoethyl ester, metal salts of maleic acid monoethyl ester, fumaric acid, fumaric acid monoethyl ester, itaconic acid, vinyl benzoic acid, vinyl phthalic acid, metal salts of fumaric acid monoethyl ester, monoesters of maleic or fumaric acid or itaconic acids where the alcohol is methyl, propyl, isopropyl, butyl, isobutyl, hexyl, cyclohexyl, octyl, 2-ethyl hexyl, decyl, stearyl, methoxy ethyl, ethoxy ethyl, hydroxy or ethyl, and the like. The graft moiety can be grafted to the ethylene copolymer by any well-known grafting process.

A useful graft copolymer of ethylene and an α-olefin contains from about 30 to 60, and preferably, about 40 to 45 weight percent of the α-olefin based on the ethylene. The copolymer also contains from about 0.1 to 9 percent, preferably about 0.1 to 4 percent, and more preferably about 0.3 to 2.0 percent by weight of the graft moiety. The graft copolymer has a number average molecular weight of from about 2,000 to 100,000; preferably about 2,000 to 65,000; more preferably about 5,000 to 35,000; and most preferably about 5,000 to 20,000. Typical values of reduced solution viscosity (RSV) are from about 0.5 to 3.5. A RSV of 2.8 corresponds to a number average molecular weight of about 80,000 and a RSV of 10 corresponds to a number average molecular weight of about 12,000. A particularly useful rubber is maleated ethylene propylene rubber which contains 45% by weight ethylene and 54.6% by weight propylene, has a Mooney viscosity of 25, and is modified with 0.4% maleic anhydride.

Surprisingly, it has been found that compositions of functionalized polyphenylene oxide, thermoplastic polymer, and functionalized ethylene α-olefin rubber have improved notched Izods.

Preferred compositions of the present invention contain from about 5 to 50 percent of the graft rubbery copolymer preferably about 10 to 40 percent, and more preferably about 15 to 30 percent of the graft rubbery copolymer.

The blends of this invention may also contain one or more conventional additives such as stabilizers and inhibitors of oxidative, thermal, and ultraviolet light degradation, lubricants and mold release agents, colorants, including dyes and pigments, flame-retardants, fibrous and particulate fillers and reinforcements plasticizers, and the like. These additives are commonly added during the mixing step.

Representative oxidative and thermal stabilizers which may be present in blends of the present invention include Group I metal halides, e.g., sodium, potassium, lithium with cuprous halides, e.g., chloride, bromide, iodide; hindered phenols, hydroquinones, and varieties of substituted members of those groups and combinations thereof.

Representative ultraviolet light stabilizers, include various substituted resorcinols, salicylates, benzotriazoles, benzophenones, and the like.

Representative lubricants and mold release agents include stearic acid, stearyl alcohol, and stearamides. Representative organic dyes include nigrosine, while representative pigments, include titanium dioxide, cadmium sulfide, cadmium selenide, phthalocyanines, ultramarine blue, carbon black, and the like. Representative fillers include carbon fibers, glass fibers, amorphous silica, asbestos, calcium silicate, aluminum silicate, magnesium carbonate, kaolin, chalk, powdered quartz, mica, feldspar, and the like.

Representative flame-retardants include organic halogenated compounds such as decabromodiphenyl ether and the like.

Representative plasticizers include lactams such as caprolactam and lauryl lactam, sulfonamides such as o,p-toluenesulfonamide and N-ethyl, o,p-toluenesulfonamide and other plasticizers known in the art.

The reaction product is preferably formed using polyphenylene oxide and the substituted olefin as recited above in the presence of a free radical catalyst. Useful free radical catalysts include peroxides such as dialkyl, diaryl, and diacyl peroxides, such as dicumyl peroxide and the like. Other useful free radical catalysts include N-bromoimides such as N-bromosuccinimide, dialkylazos and the like.

If a free radical catalyst is not employed, the reaction product is prepared by melt-blending polyphenylene oxide with the substituted olefin using conditions which are severe enough for a satisfactory reaction to occur. The reactive product need not be the complete reaction of the polyphenylene oxide and the substituted olefin. It is necessary only that a sufficient amount of reaction occur between the polyphenylene oxide and the substituted olefin so that the reactive groups of the reacted substituted olefin and polyphenylene oxide can react with the thermoplastic polymer to form the necessary graft typed linkages referred to above.

The reaction product itself is useful in that it can be independently kept for later blending with other materials or itself used as a molding compound.

The composition comprising the reaction product and the thermoplastic polymer of the present invention is useful in making injection molded, high impact resistance plastic articles such as electrical connectors, automotive parts such as exterior panels, as well as composites including laminates.

The compositions of the present invention can be prepared by conventional polymer melt blending techniques. This process is typically conducted at a temperature above the melting temperature of the polymeric additives in a closed mixing device such as an extruder. The compositions can be molded in a mold cycle time of less than about 8 seconds, and preferably, less than about 3 seconds.

The present invention is more fully illustrated by the following non-limiting Examples.

EXAMPLES

Several examples are set forth below to illustrate the nature of the invention and the manner of carrying it out. All parts are percents by weight unless otherwise indicated.

Melt blended compositions in the following Examples were tested according to the following procedures unless indicated otherwise: ASTM D-256 Notched Izod at 23° C., 3/16 inch (5 mm) thick sample; ASTM D-790 Flexural Strength and Modulus; ASTM D-638 Tensile Strength Modulus and Elongation; ASTM D-648 Heat Deflection Temperature (HDT) at the indicated load pounds per square inch (psi).

Polymer blends were extruded on a Wayne or Killion one inch (2.54 cm) single screw or a Leistrutz 28 mm co-rotating extruder using the conditions listed in the examples.

All test bars were injection molded on an Arburg All Rounder model number 221E/150 with a 35 ton clamp force. Bars (flex bars) for testing flexural properties were 3/16 inches (5 mm) thick, tensile bars were ⅛ inch (3 mm) thick. Izod testing was conducting on the flex bars. Typical molding conditions follow: Zone temperatures 1 to 3 280°, 290°, 300° C.; mold temperature 93° C.; with 900 psi (6 MPa) and 550 psi (4 MPa) pressures and cycle times of 17, 27, and 5 seconds.

Polymer extractables were performed after grinding the sample through a #20 mesh screen on a Wiley Mill. The dry, preweighed samples were then extracted overnight using a Soxhlet apparatus. To extract PPO, chloroform ($CHCl_3$) was used and for the polyamide, 2,2,2-trifluoroethanol (TFE). The samples were again dried and weighed to obtain weight loss and the percent weight loss calculated. $CHCl_3$ will extract ungrafted PPO and TFE will extract ungrafted nylon 6.

PPO carboxy titrations were performed upon a solution of PPO in a 1:1 mixture of chloroform/benzyl alcohol using a solution of NaOH in benzyl alcohol as the titrant.

Examples 1 and 2 are directed to the preparation of the reaction products of polyphenylene oxide and substituted olefin grafting agents.

EXAMPLE 1

This is an example of making a reaction product of polyphenylene oxide and maleic anhydride.

Dry poly(1,4-dimethylphenylene) oxide (PPO) (intrinsic viscosity 0.64) was intimately blended with maleic anhydride (MA) and N-Bromosuccinimide (NBS), a free radical catalyst, at a ratio of 98.9:1.0:0.1, respectively. This dry blend was extruded on a one inch (2.54 cm) single screw extruder having a L/D ratio of 24 using a 3:1 compression screw under the following conditions: temperature profile; 260°, 280°, 300°, 300° C. (Zones 1, 2, 3, and die, respectively) at 60 rpm. After dry pelletizing, the extrudate was ground in a Wiley Mill (using a 20 mesh screen) and extracted with acetone in a Soxhlet apparatus overnight. A carboxyl titration of the reaction product shows a 0.6–0.7% by weight of bound maleic anhydride The intrinsic viscosity was 0.65. The maleic anhydride is believed to be grafted (g) to the PPO.

EXAMPLE 2

The following is typical of a procedure which has been used for reacting PPO with substituted olefins followed by a Table of substituted olefins which have been used.

An intimate blend of PPO of the type used in Example 1, substituted olefin, and free radical catalyst (dicumylperoxide, Luperox 500R) in a ratio of 98.9:1:0.1 respectively was extruded on a one inch (2.54 cm) extruder under the following conditions: Temperature profile; 260°, 280°, 290°, 300° C.; 12.5:1 compression mixing screw at 60 rpm followed by dry pelletizing. The pellets were ground in a Wiley Mill using a 20 mesh screen and extracted overnight with acetone in a Soxhlet apparatus, dried, and analyzed for bound substituted olefin. The Table below gives percent reaction after such a process. This is determined by the weight of bound reactive moiety divided by the initial weight of reactive moiety.

| Substituted Olefin | Percent Reaction | Method of Analysis |
| --- | --- | --- |
| Maleic Anhydride | 76 | A |
| Fumaric Acid | 75 | A |
| Morpholinylmaleamic Acid | 85 | A |
| Cinnamic Acid | 28 | A |
| 2-Isopropenyl oxazoline | 43 | B |
| 2-Styryl oxazoline | 17 | B |
| Bis (2-hydroxyethyl)fumaramide | 89 | B* |

A - carboxyl titration
B - elemental analysis
B* - elemental analysis - material was very insoluble Examples 3–10 are directed to the preparation of compositions of functionalized PPO and polyolefin, polyamide, or polyester.

EXAMPLE 3

This is an example of making a blend of functionalized PPO and functionalized polyolefin.

49 parts of maleated PPO were mixed with 49 parts of carboxylated polypropylene (Polybond 1004, B.P. Chemicals) and 2 parts of Stabaxol P-100, an oligomeric poly(carbodiimide) from Rhein Chemie Stabaxol P-100 is understood to be poly(2,4,6-triisopropyl-1,3 phenylene carbodiimide) (PCDI). The mixture was extruded at 285° C. on a 1" (2.54 cm) single-screw killion extruder, equipped with a mixing screw (L/D=24/1). The extrudate was cooled, pelletized, and dried. The dry pellets were injection molded into standard ASTM tensile bars and tested. The blend showed the following properties: tensile modulus=279,000 psi (1,923 MPa); tensile strength=4,000 psi (28 MPa); DTUL @ 264 psi (2 pa)=134° C.; DTUL @ 66 psi (0.5 pa)=159° C. In a comparative example, a similar blend prepared with conventional molding grade polypropylene (from Soltex) excluding the Stabaxol P-100, showed the following properties: tensile modulus=266,000 psi (1834 MPa); tensile strength=3,900 psi (27 MPa). The results indicate that the use of a functionalized polyolefin and a poly(carbodiimide) provide a composition having a higher tensile modulus and strength.

EXAMPLE 4

This is an example of making a functionalized maleic anhydride PPO/polyamide blend via reactive processing of the present invention.

Pellets of maleic anhydride functionalized PPO (PPO-g-MA. made in Example 1) were intimately blended with pellets of dry excess amine terminated nylon 6 (Allied-Signal Inc.), 0.03 milliequivalents per gram (meq/g) of amine end groups, NH3 titration and 58 formic acid viscosity (FAV)) in a 60:40 weight ratio respectively. The pellet-pellet mixture was extruded on a one inch (2.54 cm) single screw extruder using a 12.5:1 compression mixing screw under the following conditions: temperature profile; 220°, 270°, 280°, 285° C. at 50 rpm. The composition was pelletized, dried, and injection molded into standard one-eighth inch (3 mm) test bars. In a comparative example, (Comparative 1), a 60:40 PPO/nylon 6 blend was extruded under identical conditions as recited above. The PPO is the same as used in Example 1 and the nylon 6 is the same as used in Example 4. Comparative 1 contained no maleic anhydride. Physical property measurements are summarized below:

|  | Comp. 1 | Ex. 4 |
| --- | --- | --- |
| RT Notched Izod (ft-lb/in) (J/M) | 0.5 (27) | 1.1 (59) |
| Tensile Modulus (psi) (MPa) | 357,000 (2,461) | 366,000 (2,523) |
| Tensile Strength (psi) (MPa) | 6,600 (46) | 10,600 (73) |
| Elongation at break (%) | 2.0 | 84 |
| HDT at 264 psi (2Pa) (°C.) | 151 | 146 |
| CHCl3 extractables (%) | 60 | 17 |

The results show that a significant amount of the PPO in Example 4 was not extracted. Example 4 had improved impact resistance and elongation at break.

EXAMPLE 5

This is an example of making a functionalized vinyl trimellitate anhydride PPO/polyamide blend.

A intimate blend of PPO and vinyl trimellitate anhydride (98.5:1.5 weight ratio, respectively) was extruded in a 1" (2.54 cm) single screw extruder using a 3:1 compression screw at 60 rpm under the following conditions: Zone temperatures (1–3, die) 235°, 260°, 295°, 300° C.; with 3600 psi (25 MPa) die pressure and 20 g/min. The strand was pelletized, dried, and blended with dry amine terminated nylon 6 of the type used in Example 4 at a weight ratio of modified PPO to nylon 6 of 60:40. This mixture was extruded using the same extruder with a mixing screw having a 12.5:1 compression ratio under the following conditions: Zone temperatures (1–3, die) 225°, 270°, 280°, 285° C.; 60 rpm; 1500 psi (10 MPa) die pressure at 25 g/min. The extrudate was cooled pelletized, and dried under vacuum at 100° C., overnight. After injection molding into test bars, the polymer blend had the following properties:

| | |
|---|---|
| Tensile elongation at Yield | % 6.6 |
| Tensile elongation at Break | % 12.5 |
| Tensile strength (psi) (MPa) | 9,063 (62) |
| Tensile modulus (psi) (MPa) | 344,000 (2,372) |
| Breaking strength (psi) (MPa) | 8,333 (57) |

EXAMPLE 6

This is an example of making a reaction product of PPO and 2-isopropenyl oxazoline, and adding polyamide to the reaction product.

An intimate blend of PPO, 1% by weight, 2-isopropenyl oxazoline (Dow Chemical), and 0.05% by weight dicumyl peroxide (Luperox 500R) was extruded using the same extruder as in Example 5 under the following conditions: Temperature profile (Zones 1–4) 270, 280, 290, 300 using a 3:1 mixing screw at 70 rpm generating 5500 psi (38 MPa) die pressure and 4 amperes on the motor. After dry pelletization, the extrudate was intimately mixed with excess acid terminated nylon 6 having 0.04 meq of —COOH per gram, at a 3:2 weight ratio of the modified PPO to the nylon 6 and extruded on a 1″ (2.54 cm) single screw extruder using a 12.5:1 mixing screw under the following conditions: Temperature profile (Zone 1–4) 250°, 275°, 280°, 290° C. at 60 rpm generating 1900 psi (13 MPa) die pressure and 1 ampere on the motor. After a water quench, pelletization, drying, and injection molding into test bars, the following tensile properties were compared to Comparative 2 which was prepared in a similar manner but contained no substituted olefin.

| | Comp 2 | Ex 6 |
|---|---|---|
| Tensile Modulus (psi) (MPa) | 359,000 (2,474) | 366,000 (2,523) |
| Tensile Strength (psi) (MPa) | 9,200 (63) | 10,400 (72) |
| Elongation at Yield (%) | 1.2 | 6.4 |
| Elongation at Break (%) | 2.8 | 9.0 |

The results indicate that the foregoing properties are improved when a substituted olefin is used.

EXAMPLE 7

This is an example of making a reaction product of PPO and a mixture of substituted olefins, and adding polyamide to the reaction product.

An intimate mixture of PPO and 1% MA of the type used in Example 1 was extruded with 0.2% by weight m-phenylene bisoxazoline (Takeda Corp.) in a 1″ (2.54 cm) single screw extruder using a 3:1 compression screw under the following conditions: Temperature profile (Zones 1–4) 250°, 270°, 285°, 300° C. at 55 rpm generating 6000 psi (41 MPa) die pressure and 5–6 Amperes on the motor. After dry pelletization, the modified PPO had an intrinsic viscosity of 0.55.

The above oxazoline modified PPO was extruded with acid terminated nylon 6 (Allied-Signal nylon 6, 0.04 meq —COOH/gm) in a 1″ (2.54 cm) extruder using a 12.5:1 mixing screw under the following conditions: Temperature profile (Zones 1–4) 250°, 265°, 265°, 285° C. at 60 rpm generating a die pressure of 2800 psi (19 MPa) and 2.5 amperes on the motor. After a water quench, pelletization drying and injection molding into test bars, the tensile properties were obtained and compared to Comparative 3 was prepared in a similar manner but below. Comparative 3 was prepared in a similar manner but contained no substituted olefin.

| | Comp 3 | Ex 7 |
|---|---|---|
| Tensile Modulus (psi) (MPa) | 359,000 (2,474) | 366,000 (2,523) |
| Tensile Strength (psi) (MPa) | 9,200 (63) | 10,400 (72) |
| Elongation at Yield (%) | 1.2 | 6.3 |
| Elongation at Break (%) | 2.8 | 29.0 |

It can be seen that the foregoing properties are improved when a substituted olefin is used.

EXAMPLE 8

This is an example of making a reaction product of PPO and fumaric acid, and adding polyamide to the reaction product. An intimate blend of powdered PPO (IV=0.63) and fumaric acid at a 99:1 weight ratio, respectively, was extruded using a 1″ (2.54 cm) extruder at 70 rpm with a 3:1 compression screw using the following temperature profiles; 260°, 280°, 300°, 300° C. (Zone 1,2,3, die respectively). After dry pelletizing, a blend of the above extrudate and amine terminated nylon 6 of the type used in Example 4 at a ratio by weight of 60:40 was extruded on a 1″ (2.54 cm) machine using 12.5:1 mixing screw at 50 rpm at the following temperatures; 220°, 270°, 280°, 285° C. After pelletizing, drying (120°/0.5 mm Hg, 12 hrs), the extrudate was molded into standard test bars. The following is a summary of the physical properties of the final composition:

| | |
|---|---|
| Flexural Modulus (psi) (MPa) | 380,000 (2,620) |
| Flexural Strength (psi) (MPa) | 10,700 (73) |
| Tensile Modulus (psi) (MPa) | 349,000 (2,406) |
| Tensile Strength (psi) (MPa) | 9,600 (66) |
| Elongation at Yield (%) | 7.3 |
| Elongation at Break (%) | 43 |
| Heat Distortion Temp. 264 psi (2 MPa), (°C.) | 150 |
| Heat Distortion Temp. 66 psi (0.5 MPa), (°C.) | 188 |
| Notched Izod (RT) ft-lb/in notch (J/M) | 1.1 (60) |
| Notched Izod (−29° C.) ft-lb/in notch (J/M) | 0.8 (43) |

COMPARATIVE 4

This example illustrates a method of melt blending different from that of the method of the present invention and shows the necessity of PPO functionalization first.

An intimate blend of amine terminated nylon 6 of the type used in Example 4 and maleic anhydride (99:1 ratio) was extruded on a 1″ (2.54 cm) single screw machine at 45 rpm. The zone (1–3, die) temperature were 199°, 216°, 232° and 249° C. while generating 1000 psi (7 MPa) die pressures. The extruded strand was orange and had many bubbles. The strand was pelletized dried and re-extruded with PPO (in a 40:60 ratio of nylon (MA)/PPO) under the following conditions; temperatures (zone 1-3, die) 216°, 241°, 271°, 299° C. at 45 rpm generating 200 psi (1.4 MPa) die pressure. After pelletizing and drying, a chloroform extraction of the brittle extrudate resulted in 59% of the mixture being extracted, indicative of negligible reaction.

EXAMPLE 9

This example illustrates using acyl lactams which are reacted with PPO. An intimate blend of PPO and acyl lactam in a weight ratio of 99:1 respectively was extruded on a one inch extruder using the following conditions: Temperature profile; 216°, 243°, 271° C.; 3:1 compression feed screw at 45 rpm followed by dry pelletizing. Sixty weight percent of reaction product pellets was dry blended with 40 percent of amine terminated nylon 6 of the type used in Example 4 and then extruded under the same condition as above except that a 12.5:1 compression mixing screw was used, The pellets were ground in a Wiley Mill using a 20 mesh screen and then extracted overnight with chloroform ($CHCl_3$). The reacted PPO was determined based on the weight of nondissolved PPO. Percent reaction is based on retained PPO divided by the initial amount of PPO.

| Substituted Olefin | Percent Reaction |
|---|---|
| N-Methacrylyl caprolactam | 16 |
| N-Methacrylyl laurolactam | 22 |

EXAMPLE 10

This example illustrates a composition of PPO reaction products and polyethylene terephthalate (PET). The reaction products of PPO and the substituted olefins were synthesized as in Example 2. These were extruded in a 1" (2.54 cm) single screw extruder in a 1:1 ratio with PET (Inherent viscosity 0.7, density 1.37 Tg=81° C.) under the following conditions: temperatures (zones 1-4, die) 216°, 243°, 271°, 288° C., at 45 rpm rising a mixing screw generating 400 psi (3 MPa) die pressure. After pelletizing and drying, the polymer was ground and extracted for 15 hours using chloroform, dried again, and weighed for weight loss. The amount of extractables less than control (no substituted olefin) which indicates the amount of PPO involved in the reaction product, is summarized in the following Table.

| Substituted olefin | % PPO extracted |
|---|---|
| Control | 51 |
| p-aminostyrene | 47 |
| glycidyl acrylate[1] | 36 |
| 2-isopropenyloxazoline | 46 |
| styrene/glycidyl methacrylate (GMA) copolymer (80:20 ratio) | 43 |
| styrene/piperylene/GMA terpolymer (67:15:18 ratio respect) | 40 |
| diallylamine-i-butyloxycarbonyl | 44 |

[1]The glycidyl acrylate was liquid injected into the extruder while the other substituted olefins were fed with PPO into the throat of the extruder.

Examples 11-25 are directed to compositions of functionalized PPO; polyolefin, polyamide, or polyester; and rubber.

EXAMPLE 11

This is an example of making a blend of PPO, maleic anhydride, NBS, and rubber, and then adding polyamide to the blend.

A physical blend of 88.9% PPO, 1% maleic anhydride, 0.1% N-bromosuccinimide (NBS), and 10% maleated ethylene propylene rubber (mEPR) (sold by Exxon as MDV-746, 45% by weight ethylene, 54.6% by weight propylene, 25 Mooney viscosity and modified with 0.4% maleic anhydride) was extruded in a one inch (2.54 cm) single Screw extruder at 274° C. After cooling and pelletizing the extrudate was blended with amine terminated nylon 6 of the type used in Example 4 in a 60:40 weight ratio respectively and re-extruded at 274° C. This blend was dried and molded into test bars. Extraction was done with $CHCl_3$ and TFE. Physical properties measurements are summarized below:

| | |
|---|---|
| Notched Izod (RT) (ft. lbs/in notch) (J/M) | 6.2 (334) |
| Flex Modulus (psi) (MPa) | 279,000 (1,923) |
| Flex Strength (psi) (MPa) | 9,800 (68) |
| Flex Modulus (psi) (MPa) | 311,000 (2,144) |
| Tensile Strength (psi) (MPa) | 8,700 (60) |
| Elongation to break (%) | 100 |
| HDT 66 psi (0.5 MPa), (°C.) | 191 |
| Unextracted residue | 30% |

EXAMPLE 12

This is another example of making a blend of PPO, maleic anhydride, NBS, and rubber, and then adding polyamide to the blend.

A physical blend of PPO, mEPR of the type used in Example 11, maleic anhydride, and NBS (in a weight ratio of 88.9:10.0:1.0:0.1 respectively) as used in Example 11 was extruded at 277° C. on a 1" (2.54 cm) single screw extruder having a 12.5:1 compression ratio screw. This extrudate after drying was dry blended with amine terminated nylon 6 of the type used in Example 4 and re-extruded in a 60:40 weight ratio of extrudate to nylon 6 under the same conditions. The physical properties of the blend are summarized below:

| | |
|---|---|
| Notched Izod, (RT) ft. lbs/in notch (J/M) | 3.3 (178) |
| Flex Modulus, psi (MPa) | 336,000 (2,316) |
| Flex Strength, psi (MPa) | 11,800 (81) |
| Tensile Modulus, psi (Mpa) | 345,000 (2,378) |
| Tensile Strength, psi (MPa) | 9,000 (62) |
| Tensile Elong to break (%) | 161 |
| HDT at (0.5 MPa) 66 psi, (°C.) | 192 |

EXAMPLE 13

This is an example of making a blend of functionalized PPO, NBS, and rubber, and then adding polyamide to the blend.

Dry PPO was physically blended with 1.0% maleic anhydride (MA) and 0.1% N-bromosuccinimide (NBS) used as a free radical catalyst, until intimate mixing was achieved. This blend was extruded using a vented one inch (2.54 cm) single screw extruder having an L/D ratio of 24, with a 3:1 compression ratio screw at 288° C. followed by dry pelletizing. A titration of the polymer indicated 0.5-0.7 weight percent of maleic anhydride reacted with the PPO.

A physical blend of 10% mEPR rubber as used in Example 11 and the above PPO/MA was extruded on a one inch (2.54 cm), 24 L/D single screw extruder using mixing screw having a compression ratio of 12.5:1 at 288° C., cooled and pelletized.

An extruder melt blend was made using the preblend of PPO/MA and mEPR and amine terminated nylon 6 of the type used in Example 4 (54:6:40 weight ratio, respectively) under the same conditions as the preblend, cooled and pelletized. The polymer alloy was dried in a vacuum oven for 10 to 15 hours at 130° C. and molded into test bars. The blend composition and properties are summarized below:

| | |
|---|---|
| Notched Izod (Room Temp.) | 6.9 |
| (ft. lb./in notch of ⅛" bar) (J/M) | (373) |
| Flex Modulus (psi) (MPa) | 305,000 |
| | (2,103) |
| Flex Strength (psi) (MPa) | 10,800 |
| | (74) |
| Tensile Modulus (psi) (MPa) | 321,000 |
| | (2,213) |
| Tensile Strength (psi) (MPa) | 9,200 |
| | (63) |
| Elongation to break (%) | 73 |
| HDT, 264 psi (2 MPa) (°C.) | 142 |
| CHCl₃ sol (%) (PPO soluble) | 36 |
| TFE sol (%) (Nylon soluble) | 32 |
| Unextracted residue (%) | 32 |

EXAMPLE 14

This is an example of making a blend of PPO, fumaric acid, NBS, and rubber, and then adding polyamide to the blend.

Compounding of PPE/N6 alloys is done on either a single or twin screw extruder in one step using multiple feed ports. At the feed throat, a previously prepared blend of 49.45% PPO, 10% mEPR, 0.5% fumaric acid, and 0.05% NBS was fed at 60% of the total melt stream by a loss in weight feeder. At the downstream feed part, nylon 6 of the type used in Example 4 was fed at 40% of the melt stream with a second loss in weight feeder. Further downstream, a vacuum vent was applied to remove trapped air, volatiles, and water. Typical operating parameters on a 30 mm Leistritz twin screw extruder were barrel temp. 220° C. to 250° C., 175 RPM, 15-19 amps, head pressure of 1400 psi, and melt temp. of 300° to 340° C. Physical properties of the compounds follow:

| | |
|---|---|
| Notched Izod, ft lb/in (J/M) | 9 (486) |
| Flex Strength, psi (MPa) | 11,000 (76) |
| Flex Modulus, psi (MPa) | 270,000 (1,861) |
| Tensile Strength, psi (MPa) | 8,000 (55) |
| Ultimate Elongation, % | 50% |

Compound was produced using diCumyl peroxide as a free radical initiator (direct replacement for NBS) in a similar manner. Physical properties of the compounds follows:

| | |
|---|---|
| Notched Izod, ft lb/in (J/M) | 9 (486) |
| Flex Strength, psi (MPa) | 11,000 (76) |
| Flex Modulus, psi (MPa) | 280,000 (1,930) |
| Tensile Strength, psi (MPa) | 8,000 (55) |
| Ultimate Elongation, % | 50% |

EXAMPLE 15

This is an example of attempting to react the rubber with an amine-terminated polybutadiene so as to maximize the heat distortion temperature.

A physical mixture of 54 parts PPO/MA from Example 1, 9 parts mEPR. described in Example 11, and 2 parts amine terminated Hycar polybutadiene ATBN (B. F. Goodrich) was extruded on a 1" (2.54 cm) single screw extruder having a 12.5:1 compression ratio screw, at 271° C. cooled, pelletized and dried. This was blended with amine terminated nylon 6 of the type used in Example 4 at a ratio of 60 parts by weight of PPO/MA to 40 parts by weight of nylon 6 by extruding on a 1" (2.54 cm) single screw extruder (same screw) at 271° C., cooled and pelletized. After drying and injection molding, the polymer blend had a room temperature notched Izod impact value of 2.2 ft.lbs/in (119 J/M), a tensile elongation to break of 52% tensile strength of 9,400 psi (65 MPa), and flexural modulus of 316,000 psi (2179 MPa).

EXAMPLE 16

The effect of rubber levels was studied in functionalized PPO/polyamide blends. All extrusions were done under identical conditions. The PPO/MA of Example 11 and mEPR rubber is the same as used in Example 11. Physical blends were extruded using a 1" (2.54 cm) single screw extruder with the following temperature profile (Zone 1-3, die); 225° C., 260° C., 275° C., and 280° C. at a screw speed of 60 rpm. The above extrudate was dried and blended with amine terminated nylon 6 of the type used in Example 4 and re-extruded (Zones 1-3, die) (225° C., 290° C., 290° C., 290° C.), cooled and pelletized. After drying and injection molding into standard test bars, physical properties were tested. Results are summarized below:

| | | | |
|---|---|---|---|
| mEPR weight % | 3 | 6 | 10 |
| PPO/MA weight % | 57 | 54 | 50 |
| Nylon 6 weight % | 40 | 40 | 40 |
| Notched Izod (RT) | 1.8 | 10.0 | 13.2 |
| (ft. lb/in notch) (J/M) | (97) | (540) | (713) |
| Flex Mod (psi) (MPa) | 425,000 | 345,000 | 350,000 |
| | (2,930) | (2,378) | (2,413) |
| Tensile Mod. (psi) | 336,000 | 366,000 | 326,000 |
| (J/M) | (2,316) | (2,523) | (2,247) |
| HDT at 66 psi | 193 | 191 | 190 |
| (0.5 MPa) (°C.) | | | |

The results indicate that generally the impact properties depend upon the amount of mEPR used.

EXAMPLE 17

In a method using the same conditions as Example 16, the level of amine terminated nylon 6 as used in Example 4 in the blend was studied. Results are summarized below:

| | | | |
|---|---|---|---|
| PPO/MA weight % | 50 | 40 | 30 |
| mEPR weight % | 10 | 10 | 10 |

|  | -continued |  |  |
|---|---|---|---|
| Nylon 6 | 40 | 50 | 60 |
| Notched Izod (RT) | 11.7 | 13.4 | 12.2 |
| (ft. lb/in notch) (J/M) | (632) | (724) | (659) |
| Flex Mod. (psi) (MPa) | 291,000 | 293,000 | 293,000 |
|  | (2,0006) | (2,020) | (2,020) |
| Tensile Mod. (psi) | 290,000 | 296,000 | 302,000 |
| (MPa) | (2,000) | (2,041) | (2,082) |
| HDT at 264 psi | 138 | 70 | 64 |
| (0.5 MPa) (°C.) |  |  |  |

EXAMPLE 18

The effectiveness of the one-step melt blending was compared to the two step melt blending of the present invention. The compositions were blended using a 28 mm corotating twin-screw extruder. The extruder had 10 zones operating at 200°, 270°, 290°, 290°, 290°, 290°, 300°, 300°, 300° and 300° C. respectively. The extruder RPM was 150; motor amperage was 13–15A; die pressure was 900–1400 psi (6–10 MPa); and L/D was 40. In the one-step process, all of the components of the composition were fed into the mouth of the extruder together. In the two-step process, all of the ingredients were fed into the mouth of the extruder together except for the amine terminated nylon 6 of the type used in Example 4 which was fed into Zone 5. After injection molding into test bars and drying physical properties were measured. Results are summarized below:

|  | One-Step | Two-Step |
|---|---|---|
| PPO/MA % | 53 | 53 |
| MA weight % | 1 | 1 |
| mEPR weight % | 6 | 6 |
| Nylon 6 weight % | 40 | 40 |
| Notched Izod (RT) | 3.2 (173) | 6.2 (335) |
| (ft. lb/in notch) (J/M) |  |  |
| Notched Izod (−29° C.) | 1.6 (86) | 2.2 (119) |
| (ft. lb/in notch) (J/M) |  |  |
| Flex Modulus (psi) (MPa) | 271,000 | 283,000 |
|  | (1,868) | (1,951) |
| Flex Strength (psi) (MPa) | 9,300 (64) | 9,900 (68) |
| Tensile Modulus (psi) | 303,000 | 316,000 |
| (MPa) | (2,089) | (2,179) |
| Elongation at Break (%) | 25 | 89 |
| HDT at 264 psi | 128 | 150 |
| (0.5 MPa) (°C.) | - |  |

The results indicate that the two-step process is more preferred than the one-step process if higher impact properties are desired.

EXAMPLE 19

This is an example of blending functionalized PPO and rubber, and adding polyamide to the blend.

An intimate blend of the fumaric acid reacted with PPO of Example 8 and mEPR (Exxon V-99-160-1, Mooney viscosity of 12 mls/min, 42% ethylene content) in a 83:17 weight ratio, respectively, was extruded on a 1" machine at 60 rpm using 12.5:1 compressing mixing screw at the following temperatures, 250°, 275°, 280°, 300° C. (Zone 1,2,3 die respectively). The extrudate was pelletized and dried at 120° C./0.5 mm Hg, for 12 hrs. It was then intimately blended with amine terminated nylon 6 of the type used in Example 4 at a 60:40 weight ratio respectively and extruded using the same conditions above except that the temperatures were 280° C. across the extruder. After pelletizing and drying, standard test bars were molded and resulted in the following physical properties:

| Tensile Modulus (psi) (MPa) | 292.000 |
|---|---|
|  | (2,013) |
| Tensile Strength (psi) (MPa) | 8,100 |
|  | (56) |
| Elongation at Yield (%) | 5.1 |
| Elongation at Break (%) | 70 |
| RT Notched Izod | 7.4 |
| (ft-lbs/inch notch) (J/M) | (400) |

EXAMPLES 20–21

The effect of amine terminated nylon was studied. A balanced nylon 6 having equal amine and acid end group termination (Allied-Signal 0.02 meq amine/carboxyl per gram, 70 FAV) was used in Example 20. This was compared to Example 21 which is a composition including amine terminated nylon 6 of the type used in Example 4.

An intimate blend of 83 parts by weight PPO reacted with fumaric acid (Example 8) and 17 parts by weight of mEPR was extruded under the following conditions; temperatures 216°, 243°, 260°, 299° C. (Zone 1–3, die), at 40 rpm, on a 1" (2.54 cm) single screw extruder using a mixing screw. This was followed by pelletizing and drying.

Sixty parts by weight of the above extrudate was re-extruded with 40 parts by weight of balanced nylon 6 or amine terminated nylon 6 (40 parts) under the same conditions above. The extrudate was dried and molded into test bars. The blends had the following properties:

|  | Ex 20 Balanced $N_6$ | Ex 21 Amine term $N_6$ |
|---|---|---|
| RT Notched Izod | 10.6 | 12.6 |
| (ft-lb/in) (J/M) | (572) | (680) |
| Flexural Modulus (psi) (MPa) | 280,000 | 275,000 |
|  | (1,930) | (1,896) |
| Flexural Strength (psi) (MPa) | 9,700 | 9,600 |
|  | (67) | (66) |
| Tensile Modulus (psi) (MPa) | 313,000 | 308,000 |
|  | (2,158) | (2,123) |
| Tensile Strength (psi) (MPa) | 8,400 | 8,200 |
|  | (58) | (57) |
| Elongation at break (%) | 22 | 104 |
| HDT at 264 psi (2 MPa) (°C.) | 138 | 147 |

The results indicate that the use of amine terminated nylon 6 is more preferred than balanced nylon 6 if higher notched Izod and elongation are desired.

EXAMPLE 22

This is an example comparing a composition of the present invention to two commercially available products.

Product A is understood to be a blend of about by weight: 50% styrene-modified PPO; 40% amine-terminated nylon 6,6; and 10% styrene-butadiene-styrene copolymer. Product B is understood to be a blend of about by weight: 50% PPO; 40% amine-terminated nylon 6,6; and 10% styrene-butadiene-styrene copolymer. In Example 22, 49.5% PPO, 0.5% fumaric acid, and 10% mEPR of the type used in Example 11 were extruded. 40% amine terminated nylon 6 of the type used in Example 4 was added.

The compositions were injection molded into standard one-eighth inch (3 mm) test bars by using a reciprocating screw mold apparatus which was operated at a temperature of about 282° to 304° C. and a pressure of about 7 to 10 MPa. The mold cycle times were measured and follow:

|  | Min. Mold Closed Time (sec) |
|---|---|
| EXAMPLE 22 | 3 |
| PRODUCT A | 16 |
| PRODUCT B | 8 |

For the composition of Example 22, the mold cycle rime was limited by the screw retraction time which was close to 3 seconds; thus, the composition was injection molded in a very brief time. For product A, the mold knockout pins penetrated the test bar at 15 seconds which resulted in an unacceptable bar due to deformation. For Product B, the mold knockout pins penetrated the test bar at 7 seconds which resulted in an unacceptable bar due to deformation.

The properties of the composition and Products A and B were measured according to the following: tensile strength and elongation—ASTM D638, flexural strength and modulus—ASTM D790, notched izod—ASTM D256, drop weight impact—ASTM D329, and DTUL—ASTM D648. The results are indicated below:

|  | Example 22 | PRODUCT A | PRODUCT B |
|---|---|---|---|
| Tensile Strength (Psi) (MPa) | 8,200 (57) | 8,400 (58) | 8,600 (59) |
| Elongation (%) | 48 | 46 | 86 |
| Flexural Strength (psi) (MPa) | 11,800 (81) | 13,000 (90) | 12,300 (85) |
| Flexural Modulus (psi) (MPa) | 295,000 (2,034) | 350,000 (2,413) | 304,000 (2,096) |
| Notched Izod (ft lb/in) (J/M) | 9.5 (513) | 4.5 (243) | 4.7 (254) |
| Notched Izod @ −40° C. (ft lb/in) (J/M) | 4.8 (259) | 3.9 (211) | 3.0 (162) |
| Drop Weight Impact (ft lb) (J) | 64 (87) | 83 (113) | 89 (121) |
| DTUL @ 66 psi (0.5 MPa) °C. | 168 | — | 174 |
| DTUL @ 264 psi (2 MPa) °C. | 106 | — | 146 |

The results indicate that the composition including maleated ethylene-propylene rubber has significantly improved impact resistance and shorter cycle times compared with compositions including styrene-butadiene-styrene rubber.

EXAMPLE 23

This is an example of blending polyamide with rubber, and then adding functionalized PPO to the blend.

A physical blend of amine terminated nylon 6 of the type used in Example 4 and mEPR rubber of the type used in Example 11. There was 87% by weight of nylon and 13 percent by weight of the mEPR. The blend was extruded on a 1" (2.54 cm) single (12.5:1 mixing) screw extruder having a 12.5:1 compression ratio mixing screw at 260° C. After cooling, pelletization and drying, the above extrudate was re-extruded with PPO/MA from Example 1 in a 40/60 ratio respectively at 274° C. This composition was cooled, pelletized, dried, and molded into test bars. The material had the following properties:

| Notched Izod, (RT) ft. lbs/in notch (J/M) | 3.1 (167) |
|---|---|
| Tensile, Elongation to Break (%) | 39 |
| Flexural Modulus (psi) (MPa) | 291,000 (2,006) |
| Tensile Strength (psi) (MPa) | 8,200 (57) |
| HDT at 264 psi (2 MPa) (°C.) | 122 |

EXAMPLE 24

This is an example of making a blend of PPO, a shell/core rubber, and fumaric acid, and then adding polyamide to the blend.

An intimate physically mixed blend of PPO, Acryloid KM 330 shell/core rubber (Rohm and Haas Co.), and fumaric acid in a 49:10:1 weight ratio respectively was fed into a 28 mm co-rotating twin screw extruder at 240° C. and 200 rpm. 40 parts amine terminated nylon 6 of the type used in Example 4 at an average temperature of 240° C. was added into a downstream feed port (Zone 5). The PPO was the same as in Example 1, and the nylon 6 was the same as used in Example 4. The KM 330 rubber is a shell/core polymer, which is believed to have a shell made of polymethylmethacrylate and a core of polybutylacrylate. After cooling, pelletizing, and drying, test bars were molded. Property measurements are summarized below:

| RT Notched Izod (ft-lb/in) (J/M) | 6.8 (367) |
|---|---|
| Flexural Modulus (psi) (MPa) | 296,000 (2,041) |
| Flexural Strength (psi) (MPa) | 10,000 (69) |
| Tensile Modulus (psi) (MPa) | 342,000 (2,358) |
| Tensile Strength (psi) (MPa) | 8,500 (59) |
| Elongation at break (%) | 128 |
| HDT at 264 psi (2 MPa) (°C.) | 134 |

EXAMPLE 25

This is an example of making a blend of functionalized PPO and rubber, and adding polyester to the blend.

Functionalized PPO was prepared by intimately blending powdered PPO (I.V.=0.6) and fumaric acid (99.1 weight ratio) extruding on a 28 mm corotating, twin-screw extruder at 280° C. It was then pelletized and dried. 55.3 parts of the maleated PPO pellets were mixed with 3.3 parts of maleated EP rubber of Example 11 and 1.1 parts of m-phenylene bis 1,3 oxazoline and extruded on a co-rotating, twin-screw extruder at 265° C. while feeding downstream a mixture of 37 parts of PET (0.7 I.V.) and 3.3 parts of maleated EP rubber. The downstream feed port was located on Zone 5 (out of total 10 zones). The blend was extruded at a throughput rate of 15 lbs (7 kg)/hr and pelletized. After thoroughly drying the pellets in a vacuum oven, the material was injection molded and tested under standard conditions. The blend had a flexural modulus of 328,000 psi (2,262 MPa); flexural strength 8,500 psi (59 MPa); and tensile strength of 6,000 psi (41 MPa). These properties are significant improvements over control blends prepared as follows.

In another example, a blend containing 56.4 parts of PPO (functionalized), 37 parts of PET, and 6.6 parts of maleated EP rubber was extruded and pelletized under essentially the same conditions. The blend after injection molding showed a flexural modulus of 307,000 psi (2,116 MPa); flexural strength of 6,800 psi (47 MPa); and tensile strength of 4,000 psi (28 MPa).

Having described the invention in detail and by reference to preferred embodiments thereof, it will be apparent that modifications and variations are possible without departing from the scope of the invention defined in the appended claims.

What is claimed is:

1. A composition comprising:
   a) about 5 to 95 percent by weight, based on the total weight of said composition, of a reaction product comprising
      1) about 70 to 99.99 percent by weight polyphenylene oxide; and
      2) about 0.01 to 30 percent by weight of a substituted olefin having the formula:

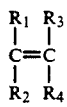

wherein one to two of $R_1$, $R_2$, $R_3$, and $R_4$ individually are selected from a reactive group consisting of a carboxylic acid, acid anhydride, acid amide, imido, carboxylic ester, amino group, hydroxyl group, epoxy group, oxazoline, oxazolone, oxazine, oxazinone, isocyanate, carbamate, carbamoyl lactam, acyl lactam, and mixtures, and wherein the remaining two to three of $R_1$, $R_2$, $R_3$, and $R_4$ individually are H or a hydrocarbon radical of from 1 to about 20 carbon atoms;
   b) about 5 to 95 percent by weight, based on the total weight of said composition, of amine terminated polyamide which is blended with said reaction product; and
   c) about 5 to 50 percent by weight, based on the total weight of said composition, of a functionalized ethylene α-olefin rubber.

2. The composition of claim 1 wherein said oxazoline and oxazine radicals have the formula:

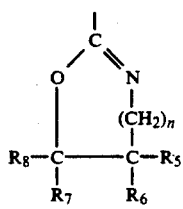

said oxazolone and oxazinone radicals have the formula:

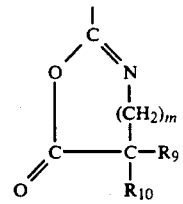

wherein $R_5$–$R_{10}$ are selected from H, alkyl groups having from 1 to 20 carbons, and aryl groups having from 6 to 14 carbons, n is 0 or 1 and m is 0 or 1; said isocyanate radical has the formula:

said carbamate radical has the formula:

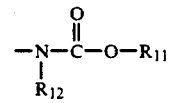

wherein $R_{11}$ and $R_{12}$ are selected from —H, an alkyl radical, and an aryl radical; said acyl lactam radical has the formula:

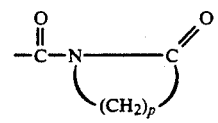

wherein p is from 2 to 11; and said carbamoyl lactam radical has the formula:

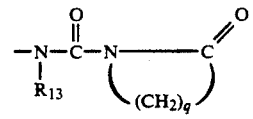

wherein $R_{13}$ is selected from —H, an alkyl radical, and an aryl radical, and q is from 2 to 11.

3. The composition of claim 1 wherein said functionalized ethylene α-olefin rubber is ethylene propylene rubber.

4. The composition of claim 3 wherein said functionalized ethylene α-olefin rubber is maleated ethylene propylene rubber.

5. A composition comprising:
   a) about 5 to 95 percent by weight, based on the total weight of said composition, of a reaction product comprising
      1) about 70 to 99.99 percent by weight polyphenylene oxide; and
      2) about 0.01 to 30 percent by weight maleic anhydride;
   b) about 5 to 95 percent by weight, based on the total weight of said composition, of an amine terminated polyamide which is blended with said reaction product; and
   c) about 5 to 50 percent by weight, based on the total weight of said composition, of a maleated ethylene propylene rubber.

* * * * *